(12) United States Patent
Stefanoni et al.

(10) Patent No.: US 11,697,768 B2
(45) Date of Patent: Jul. 11, 2023

(54) FOAMING ADDITIVE WITH LOW ECOTOXICOLOGICAL IMPACT FOR SOIL CONDITIONING IN THE PRESENCE OF MECHANISED EXCAVATION

(71) Applicant: MAPEI SPA, Milan (IT)

(72) Inventors: Massimo Stefanoni, Milan (IT); Marco Squinzi, Milan (IT); Carlo Pistolesi, Milan (IT); Enrico Dal Negro, Milan (IT); Alessandro Boscaro, Milan (IT)

(73) Assignee: MAPEI SPA, Milan (IT)

( * ) Notice: Subject to any disclaimer, the term of this patent is extended or adjusted under 35 U.S.C. 154(b) by 169 days.

(21) Appl. No.: 17/262,389

(22) PCT Filed: Jul. 23, 2019

(86) PCT No.: PCT/IB2019/056273
§ 371 (c)(1),
(2) Date: Jan. 22, 2021

(87) PCT Pub. No.: WO2020/021445
PCT Pub. Date: Jan. 30, 2020

(65) Prior Publication Data
US 2021/0269718 A1    Sep. 2, 2021

(30) Foreign Application Priority Data
Jul. 23, 2018 (IT) .......... 102018000007438

(51) Int. Cl.
| C09K 17/16 | (2006.01) |
| C09K 17/32 | (2006.01) |
| E21D 9/00  | (2006.01) |
| E21D 9/10  | (2006.01) |

(52) U.S. Cl.
CPC ........... *C09K 17/16* (2013.01); *C09K 17/32* (2013.01); *E21D 9/001* (2013.01); *E21D 9/10* (2013.01)

(58) Field of Classification Search
None
See application file for complete search history.

(56) References Cited

U.S. PATENT DOCUMENTS

| 2016/0022557 A1* | 1/2016 | Galleguillos | A61Q 5/02 510/130 |
| 2019/0144794 A1* | 5/2019 | Velasquez | A61Q 5/02 510/392 |
| 2021/0171365 A1* | 6/2021 | Nelson | B03D 1/008 |

FOREIGN PATENT DOCUMENTS

| CN | 106433679 A | 2/2017 | |
| CN | 108138087 A * | 6/2018 | ............. B21D 19/08 |
| WO | WO-9414918 A1 * | 7/1994 | .......... B01F 17/0028 |
| WO | 2017108382 A1 | 6/2017 | |

OTHER PUBLICATIONS

Search Report and Written Opinion of PCT/IB2019/056273 dated Oct. 17, 2019.

* cited by examiner

*Primary Examiner* — Charles R Nold
(74) *Attorney, Agent, or Firm* — Silvia Salvadori, P.C.; Silvia Salvadori

(57) ABSTRACT

The present invention relates to the use of foaming additives in liquid, paste or powder form, to condition soil excavated with a tunnel boring machine. Said additives can be classified as readily biodegradable and are characterised by a lower ecotoxicological impact than commercial products.

5 Claims, No Drawings

FOAMING ADDITIVE WITH LOW ECOTOXICOLOGICAL IMPACT FOR SOIL CONDITIONING IN THE PRESENCE OF MECHANISED EXCAVATION

This application is a U.S. national stage of PCT/IB2019/056273 filed on 23 Jul. 2019, which claims priority to and the benefit of Italian Application No. 102018000007438 filed on 23 Jul. 2018, the contents of which are incorporated herein by reference in their entireties.

The present invention relates to the use of foaming additives in liquid, paste or powder form to condition soil excavated with a tunnel boring machine. Said additives can be classified as readily biodegradable and are characterised by a lower ecotoxicological impact than commercial products.

PRIOR ART

Currently, tunnels can be excavated by two main technologies:
- use of explosives (the classic method);
- use of mechanical equipment.

The first method involves cyclical application of the operations described below:
1) Using a Jumbo machine, a series of holes are drilled in the tunnel face and packed with explosive; the arrangement of the holes and the amount of explosive are calibrated in such a way as to demolish the desired portion of rock without damaging the portions thereof which will act as natural supports for the excavation;
2) The excavated material (called muck) is removed with bulldozers and trucks;
3) The excavation is supported by ribs and shotcrete.

Said method is based on eliminating the right portion of rock so as to redistribute forces around the excavation, resulting in the "arch effect", which partly supports the consolidating action of the reinforcing rods and shotcrete.

The second construction technique can be divided into two main categories: the partial-face system and the full-face system (which involves excavating the entire tunnel diameter at the same time). In the first case, operations proceed as already described for the conventional method with roadheaders and rock breakers (instead of explosive), gradually forming the shape of the tunnel which will subsequently be lined with reinforced concrete. In the second case the advance is effected with a complex machine called a Tunnel Boring Machine (TBM), also known as a "mole" which, as well as performing the excavation, supports and prevents collapses of the face, carries away muck (by means of a screw and a conveyor belt), and places the final tunnel lining, consisting of prefabricated reinforced concrete segments. This type of machine can excavate nearly all types of geological material, including compact rock (hard-rock TBM), fractured rock (double-shield TBM), loose soil and under aquifers (EPB—Earth Pressure Balance machine).

A TBM consists of:
1) the head, namely the front part in direct contact with the tunnel face, which serves to excavate, support the face, collect and convey muck to an evacuation system;
2) a system for transporting the muck out of the tunnel (such as a conveyor belt);
3) an excavation chamber located between the cutterhead and the muck conveyance system wherein the excavated material is collected. The material exits from the chamber on a screw conveyor or auger, and is placed on a roller conveyor;
4) a tunnel lining system.

The cutterhead is fitted with tools called cutters, namely steel discs, which are designed to demolish the soil. Scrapers convey the soil to the conveyor belt that carries it out of the tunnel.

The advance must take place with the excavation chamber constantly and completely full of suitably conditioned excavated material, in order to guarantee homogenous, uniform distribution of soil pressure on the tunnel face and prevent pressure drops between one push and the next. Said machines operate well when the layers through which the tunnel is driven are relatively hard and rigid, but do not perform so well when soft, friable soils are excavated. One technique used to overcome this problem is to apply a conditioning agent to the soil through the cutterhead. This stabilises the soil and facilitates excavation and soil extraction.

In the latest developments of this technology, polymer foams have been suggested. They have the considerable advantage that they considerably reduce the input of water into the soil. A standard foaming agent formulation comprises a foaming agent and a stabilising agent.

Thus, in operation, the foam is directly injected into the cutterhead at the excavation interface.

The excavated soil is thus characterised by an organic content, deriving from the use of said additives, which interferes with the ecosystem.

This influence is defined by ecotoxicological tests conducted on the products "as is" or on matrices conditioned with the additives according to the invention.

The foaming products generally used contain anionic surfactants. Said anionic surfactants are usually C12-16 alcohol ethoxylate (1-4 ethoxylation groups) sulphates. They are salified organic compounds, generally as sodium salts.

Examples of foaming additives available on the market are:
1. POLYFOAMER ECO 100 and POLYFOAMER FP/CC (Mapei S.p.A.);
2. FOAMEX EC, FOAMEX TR and FOAMEX SNG (Lamberti);
3. MASTERROC SLF 30, MASTERROC SLF 41, MASTERROC ACP 143 and MASTERROC SLF 32 (BASF)
4. SIKA FOAM TBM 101 (SIKA).

The product which is currently most widely used is called Polyfoamer ECO 100, comprising 10 to 20% by weight of a mixture of linear alcohols with a C12-C14 alkyl ethoxylate chain, sulphonated and salified with sodium.

EP 1027528 illustrates a boring method wherein the composition of the aqueous material injected into the tunnel face consists of a polyethylene oxide with a molecular weight ranging between 2 and 8 million and an anionic surfactant containing sulphate.

U.S. Pat. No. 6,172,010 discloses an aqueous foaming additive consisting of a surfactant and a polymer characterised by opposite charges, to obtain a stable foam.

U.S. Pat. No. 6,802,673 discloses an aqueous foaming additive consisting of an anionic surfactant and a β-naphthalene sulphonate formaldehyde condensate.

U.S. Pat. No. 4,442,018 discloses the composition of an additive for the production of a stable foam in aqueous phase consisting of an acrylic acid polymer, a C12-C14 and C16 alcohol, a C4 and C5 alcohol, sodium lauryl sulfate or alpha-olefin sulphonate, and water.

DESCRIPTION OF THE INVENTION

The present invention relates to the use as conditioning foaming additive of a salified alkyl ether sulphate having a straight or branched C7-C11 alkyl chain and a degree of ethoxylation ranging between 4 and 9 as conditioning agent able to generate foam during mechanised soil excavation with a TBM. The additive, in liquid, paste or powder form, generates foam when added in percentages of 0.1-4% by weight to an aqueous solution used on the tunnel face to soften the soil and allow faster extraction, and in the conditioning chamber to maintain the stability of the tunnel face.

The use of a salified alkyl ether sulphate having a branched C7-C11 alkyl chain and a degree of ethoxylation of 7-9 is preferred. The alkyl ether sulphate is preferably a sodium or potassium salt.

The salified alkyl ether sulphate can be used in addition to an aqueous solution in a percentage by weight of 0.1-4.0%.

The salified alkyl ether sulphate can also be used in admixture with one or more surfactants selected from acyl glutamates and alkyl polyglucosides, in particular in admixture with an acyl glutamate selected from cocoyl glutamate, lauroyl glutamate, myristoyl glutamate, capryloyl glutamate, caproyl glutamate and the sodium salts thereof or in admixture with an alkyl polyglucoside selected from decyl glucoside, capryl glucoside, lauryl glucoside and cocoyl glucoside. Lauroyl glutamate, in particular in the form of sodium salt, and capryl glucoside, are particularly preferred.

The percentages by weight of the total surfactant(s) present in the conditioning additive can range from 30 to 100% for alkyl ether sulphate, 0 to 50%, preferably 5 to 50%, for acyl glutamates, and 0 to 50%, preferably 10 to 50%, for alkyl polyglucoside, obviously on the proviso that the total is 100.

The surfactants according to the invention are classifiable as readily biodegradable according to the OECD 301 guidelines.

The additives can also contain foam stabilisers able to increase the half-lives of the foams generated. The stabilisers can be biopolymers. The term "biopolymers" refers to polymers degradable due to the effect of micro-organisms such as bacteria, fungi or seaweed. They are mainly water-soluble polysaccharides able to increase the viscosity of an aqueous system in a pH range between 4 and 12. The preferred biopolymers are xanthan gum and guar gum.

The additives are characterised by a lower ecotoxicological impact than the products commercially available and used in mechanised excavations.

The foaming additive can also contain other compounds useful to deal with specific problems such as clogging due to clayey soils, to prevent high consumption of the cutters fitted in the cutterhead, or to reduce the quantity of soluble salts in the water present in the excavation soil.

The characteristics and advantages of the use according to the invention are more particularly described in the examples below. The percentages of the ingredients are expressed by weight.

Example 1: Conditioning Additive Compositions According to the Invention

TABLE 1

Composition of formulations

| | Parts by weight (%) | | | | | |
|---|---|---|---|---|---|---|
| | Sample 1 | | Sample 2 | | Sample 3 | |
| | A | B | A | B | A | B |
| Straight C12-C14 alcohol ethoxylate (2-3 moles of ethylene oxide) and sodium sulphate | 1.0 | 8.8 | 2.5 | 15.5 | 5.4 | 37.2 |
| Branched C9-C11 alcohol ethoxylate (7 moles of ethylene oxide) sodium sulphate | 10.0 | 87.7 | 5.5 | 34.2 | 3.0 | 20.7 |
| Lauroyl sodium glutamate | — | — | 7.5 | 46.6 | 2.0 | 13.8 |
| Capryl glucoside | — | — | — | — | 3.5 | 24.1 |
| Xanthan gum | 0.3 | 2.6 | 0.5 | 3.1 | 0.5 | 3.5 |
| Sodium hydroxide | 0.1 | 0.9 | 0.1 | 0.6 | 0.1 | 0.7 |
| Water | 88.6 | — | 83.6 | — | 85.2 | — |

Column A shows the composition by weight expressed as a percentage of the formulation, while column B shows the weight percentage of the single compound as a percentage of the active content. The stability of the foam generated by an aqueous solution prepared by adding 2% by weight of foaming additive to 5000 g of water is evaluated. The stability is expressed as the half-life, which indicates the time required for the weight of the foam to halve. The test is conducted by evaluating the time in which water amounting to half the weight/volume of the foam is released in a 250 ml cylinder. The foam is formed by a generator that conveys the flow of liquid at a constant airflow into a glass ball mixer.

TABLE 2

Half-life

| | Half-life (sec) |
|---|---|
| Polyfoamer ECO 100 | 746 |
| Sample 1 | 730 |
| Sample 2 | 1291 |
| Sample 3 | 800 |

The data set out in Table 2 demonstrate that the stability of the foams generated with the products of lower ecotoxicological impact have half-lives comparable to or better than that of the foam generated with the commercial product.

Example 2: Conditioning Capacity of the Additives of Example 1

The conditioning capacity of the additives of Example 1 was evaluated with a stabilised soil called "Vitali" (particle size 0.075-25 mm). The foam used to condition the matrix is generated from an aqueous solution prepared by adding 2% by weight of foaming additive to 5000 g of water. The foam is formed by a generator that conveys the flow of liquid at a constant airflow into a glass ball mixer. The evaluation involves adding the foams generated with the additives to three 11 kg samples of aggregate, and homogenising the mixture in an IMER 5140 cement mixer (drum capacity 138 lt) for 5 minutes. The matrix conditioning is scored as a slump class. The results are set out in Table 3:

TABLE 3

Slump class

| | Slump class (cm) |
|---|---|
| Polyfoamer ECO 100 | 20 |
| Sample 1 | 18 |
| Sample 2 | 16 |
| Sample 3 | 18 |

The data demonstrate the good conditioning capacity of the new formulations.

Example 3: Composition of Alcohol-Free Additive Having a Lower Degree of Ethoxylation (Present in Commercial Additives)

TABLE 4

Composition of samples

| | Parts by weight (%) Sample 4 | |
|---|---|---|
| | A | B |
| Straight C12-C14 alcohol ethoxylate (2-3 moles of ethylene oxide) sodium sulphate | — | — |
| Branched C9-C11 alcohol ethoxylate (7 moles of ethylene oxide) sodium sulphate | 4.0 | 28.0 |
| Lauroyl sodium glutamate | 3.0 | 21.0 |
| Capryl glucoside | 6.5 | 45.4 |
| Xanthan gum | 0.5 | 3.5 |
| 30% soda solution | 0.3 | 2.1 |
| Water | 85.7 | — |

Column A shows the composition by weight expressed as a percentage of the formulation, while column B shows the weight percentage of the single compound as a percentage of the active content. Sample no. 4 was formulated without straight Cl 2-C14 alcohol ethoxylate (2-3 moles of ethylene oxide) and sodium sulphate.

The stability of the foam generated by an aqueous solution prepared by adding 2% by weight of foaming additive to 5000 g of water is evaluated. The stability is expressed as the half-life, which indicates the time required for the weight of the foam to halve. The test is conducted by evaluating the time in which water amounting to half the weight/volume of the foam is released in a 250 ml cylinder.

The foam is formed by a generator using a constant airflow.

TABLE 5

Half-life

| | Half-life (sec) |
|---|---|
| Polyfoamer ECO 100 | 746 |
| Sample 4 | 855 |

The data demonstrate an increase in the stability of the foam.

Example 4

The foaming additives have the following compositions:

TABLE 6 composition of samples

| | Parts by weight (%) Sample 7 | |
|---|---|---|
| | A | B |
| Straight C12-C14 alcohol ethoxylate (2-3 moles of ethylene oxide) sodium sulphate | — | — |
| Branched C9-C11 alcohol ethoxylate (7 moles of ethylene oxide) sodium sulphate | 4.0 | 28.0 |
| Lauroyl sodium glutamate | 3.0 | 21.0 |
| Capryl glucoside | 6.5 | 45.4 |
| Xanthan gum | 0.5 | 3.5 |
| 30% soda solution | 0.3 | 2.1 |
| Water | 85.7 | — |

Column A shows the composition by weight expressed as a percentage of the formulation, while column B shows the weight percentage of the single compound as a percentage of the active content. Sample no. 7 was formulated without straight C12-C14 alcohol ethoxylate (2-3 moles of ethylene oxide) and sodium sulphate, which is always present as foam generator in commercial products.

The stability of the foam generated by an aqueous solution prepared by adding 2% by weight of foaming additive to 5000 g of water is evaluated. The stability is expressed as the half-life, which indicates the time required for the weight of the foam to halve. The test is conducted by evaluating the time in which water amounting to half the weight/volume of the foam is released in a 250 ml cylinder. The foam is formed by a generator using a constant airflow.

TABLE 7

Half-life

| | Half-life (sec) |
|---|---|
| Polyfoamer ECO 100 | 746 |
| Sample 7 | 855 |

The data set out in Table 7 demonstrate an increase in the stability of the foam.

Example 5: Conditioning Capacity of the Additive of Example 3

The conditioning capacity of the additive of Example 3 was evaluated by the method described in Example 2. The results are set out in Table 8:

TABLE 8

Slump class

| | Slump class (cm) |
|---|---|
| Polyfoamer ECO 100 | 20 |
| Sample 4 | 18 |

The data demonstrate the good conditioning capacity of sample no. 4, formulated without straight C12-C14 alcohol ethoxylate (2-3 moles of ethylene oxide) and sodium sulphate, which is always present as foam generator in commercial products.

Example 6: Aquatic Toxicity of an Additive of Example 1 by Comparison with a Commercial Additive The toxicity in an aquatic environment of the additives called "Polyfoamer ECO 100" and "sample 1", described in Table 1, was evaluated according to the OECD Guidelines on acute toxicity in fish (OECD 203), algae (OECD 201) and daphnia (OECD 202). The data are expressed as:
- OECD 203 LC50: lethal concentration that kills 50% of fish in a single exposure.
- OECD 202 and 201 EC50: median effective concentration that produces an effect (other than death) on 50% of the population. The lower the value in mg/l, the higher the toxicity.

The data are summarised in Table 9 below:

TABLE 9

| Aquatic toxicity | | |
|---|---|---|
| OECD Guideline | Polyfoamer ECO 100 | Sample 1 |
| OECD 203: acute toxicity in fish LC50 (mg/l) | 25 | 880 |
| OECD 202: acute toxicity in daphnia EC50 (mg/l) | 112 | 650 |
| OECD 201: acute toxicity in algae EC50 (mg/l) | 170 | 200 |

The data demonstrate the lower ecotoxicological impact of sample 1. By replacing part of the straight C12-C14 alcohol ethoxylate (2-3 moles of ethylene oxide) and sodium sulphate with branched C9-C11 alcohol ethoxylate (7 moles of ethylene oxide) sodium sulphate, a foaming additive with lower aquatic excitoxicity is obtained.

Example 7: Aquatic Toxicity of the Additives of Example 1 by Comparison with a Commercial Additive The acute toxicity in fish of the additives called "Polyfoamer ECO 100", "sample 2" and "sample 3", described in Table 1, was evaluated. The data, obtained according to OECD guideline 203, are expressed as:
- OECD 203 LC0: maximum concentration that kills 0% of fish in a single exposure.
- OECD 203 LC50: lethal concentration that kills 50% of fish in a single exposure.
- OECD 203 LC100: lethal concentration that kills 50% of fish in a single exposure. The data are summarised in Table 10 below: the lower the value in mg/I, the higher the toxicity.

TABLE 10

| Aquatic toxicity | | | |
|---|---|---|---|
| OECD Guideline 203 | Polyfoamer ECO 100 | Sample 2 | Sample 3 |
| Acute toxicity in fish LC0 (mg/l) | 12 | 200 | 100 |
| Acute toxicity in fish LC50 (mg/l) | 25 | 380 | 240 |
| Acute toxicity in fish LC100 (mg/l) | 50 | 800 | 400 |

The data demonstrate the lower ecotoxicological impact of samples 2 and 3. By replacing the C12-C14 alcohol ethoxylate (2-3 moles of ethylene oxide) sodium sulphate with the surfactants listed in Table 1, foaming additives with lower acute toxicity in fish are obtained. In particular, the toxicity declines in proportion to the C12-C14 alcohol content.

Example 8: Acute Toxicity in Fish of the Additive of Example 3

The acute toxicity in fish of the additives called "Polyfoamer ECO 100" and "sample 4" was evaluated according to OECD 203. The data are expressed as:
- OECD 203 LC0: maximum concentration that kills 0% of fish in a single exposure.
- OECD 203 LC50: lethal concentration that kills 50% of fish in a single exposure.
- OECD 203 LC100: lethal concentration that kills 50% of fish in a single exposure. The data are summarised in Table 11 below: the lower the value in mg/l, the higher the toxicity.

TABLE 11

| Aquatic toxicity | | |
|---|---|---|
| OECD Guideline 203 | Polyfoamer ECO 100 | Sample 4 |
| Acute toxicity in fish LC0 (mg/l) | 12 | 2000 |
| Acute toxicity in fish LC50 (mg/l) | 25 | 3500 |
| Acute toxicity in fish LC100 (mg/l) | 50 | >4000 |

The data demonstrate the lower ecotoxicological impact of sample 4. By wholly replacing the C12-C14 alcohol ethoxylate (2-3 moles of ethylene oxide) sodium sulphate with the surfactants listed in Table 4, a foaming additive characterised by much lower acute toxicity in fish was obtained.

Example 9: Acute Toxicity in Fish of the Additive of Example 4

The foaming additives called "Polyfoamer ECO 100" and "sample 7" were evaluated to establish their acute toxicity in fish (OECD 203).

The data are expressed as:
- OECD 203 LC0: maximum concentration that kills 0% of fish in a single exposure. OECD 203 LC50: lethal concentration that kills 50% of fish in a single exposure.
- OECD 203 LC100: lethal concentration that kills 50% of fish in a single exposure. The data are summarised in Table 12 below: the lower the value expressed in mg/1, the higher the toxicity.

TABLE 12

| Aquatic toxicity | | |
|---|---|---|
| OECD Guideline 203 | Polyfoamer ECO 100 | Sample 7 |
| Acute toxicity in fish LC0 (mg/l) | 12 | 2000 |
| Acute toxicity in fish LC50 (mg/l) | 25 | 3500 |
| Acute toxicity in fish LC100 (mg/l) | 50 | >4000 |

The data set out in Table 12 demonstrate the ecotoxicological impact of sample 7. By wholly replacing the C12-C14 alcohol ethoxylate (2-3 moles of ethylene oxide) sodium sulphate with the surfactants listed in Table 6, a foaming additive characterised by much lower acute toxicity in fish was obtained.

The invention claimed is:

1. A method of generating a foam starting from a soil conditioning additive in liquid, paste or powder form, said foam being able to condition soil during mechanised excavations with a tunnel boring machine, said soil conditioning additive comprising a salified alkyl ether sulphate surfactant having a straight or branched C7-C11 alkyl chain and a degree of ethoxylation ranging from 7 to 9, from 5 to 50% by weight of the surfactant of an acyl glutamate and from 10 to 50% by weight of the surfactant of alkyl polyglucosides said method comprising
   adding said salified alkyl ether sulphate surfactant to an aqueous solution used during said mechanised excavations; and
   generating said foam.

2. The method according to claim 1 wherein the acyl glutamates are selected from cocoyl glutamate, lauroyl glutamate, myristoyl glutamate, capryloyl glutamate, caproyl glutamate and the sodium salts thereof.

3. The method according to claim 1 wherein the salified alkyl ether sulphate having a branched C7-C11 alkyl chain and a degree of ethoxylation of 7-9, is in the form of sodium or potassium salt.

4. The method according to claim 1 wherein said soil conditioning additive further comprises xanthan gum or guar gum as foam stabilisers.

5. The method according to claim 1 wherein the soil conditioning additive is added to an aqueous solution, in percentages by weight of 0.1-4.0%, to obtain a matrix characterised by an air content dependent on the degree of foaming.

* * * * *